United States Patent
Ilves

(10) Patent No.: US 9,461,557 B2
(45) Date of Patent: Oct. 4, 2016

(54) BIPOLAR DOUBLE VOLTAGE CELL AND MULTILEVEL CONVERTER WITH SUCH A CELL

(71) Applicant: ABB AB, Västerås (SE)

(72) Inventor: Kalle Ilves, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 14/763,140

(22) PCT Filed: Mar. 22, 2013

(86) PCT No.: PCT/EP2013/056101
§ 371 (c)(1),
(2) Date: Jul. 23, 2015

(87) PCT Pub. No.: WO2014/146721
PCT Pub. Date: Sep. 25, 2014

(65) Prior Publication Data
US 2015/0365011 A1 Dec. 17, 2015

(51) Int. Cl.
| | | |
|---|---|---|
| H02M 7/483 | (2007.01) | |
| H02M 1/12 | (2006.01) | |
| H02M 7/06 | (2006.01) | |
| H02J 3/36 | (2006.01) | |

(52) U.S. Cl.
CPC ............... *H02M 7/06* (2013.01); *H02J 3/36* (2013.01); *H02M 1/12* (2013.01); *H02M 7/483* (2013.01); *H02M 2007/4835* (2013.01)

(58) Field of Classification Search
CPC .......... H02M 7/42; H02M 7/44; H02M 7/48; H02M 7/483; H02M 7/49; H02M 7/537; H02M 7/5387; H02M 2007/4835; H02M 1/15; H02M 1/32; H02M 7/06; H02M 2001/322; H02M 2001/325; H02M 7/08; H02M 7/12; H02M 7/487; H02J 3/36; H02H 7/122; H02H 7/1222; H02H 7/1225; H02H 7/1227; H02H 7/125; H02H 7/1252; H02H 7/1255; H02H 7/1257; H02H 9/00; H02H 9/001; H02H 9/002; H02H 9/004; H02H 9/005; H02H 9/007; H02H 9/008; H02H 9/02; H02H 9/021; H02H 9/023; H02H 9/025; H02H 9/026; H02H 9/028
See application file for complete search history.

(56) References Cited

U.S. PATENT DOCUMENTS

| | | |
|---|---|---|
| 2007/0096701 A1 | 5/2007 | Steimer |
| 2010/0052434 A1 | 3/2010 | Haederli |

(Continued)

FOREIGN PATENT DOCUMENTS

| | | | | |
|---|---|---|---|---|
| CH | WO 2014154241 A1 | * | 10/2014 | ............... H02M 1/32 |
| DE | WO 2011067120 A1 | * | 6/2011 | ............... H02M 7/49 |

(Continued)

OTHER PUBLICATIONS

Gateau et al., "Stacked Multicell Converter (SMC): Topology and control", EPE 2001—Graz, Jan. 1, 2001, pp. 1-10.

(Continued)

*Primary Examiner* — Timothy J Dole
*Assistant Examiner* — Ivan Laboy Andino
(74) *Attorney, Agent, or Firm* — Birch, Stewart, Kolasch & Birch, LLP

(57) ABSTRACT

A multilevel converter cell includes a first section with a first group of series connected switching units in parallel with a first energy storage element, where a junction between a first and second switching units of the first group of series connected switching units forms one cell connection terminal, a second section with a second group of series connected switching units in parallel with a second energy storage element, where a junction between a third and fourth switching units of the second group of series connected switching units forms another cell connection terminal, and an interconnecting section with a third group of series-connected switching units comprising a fifth, sixth and seventh switching unit, with the fifth and sixth switching units connected in parallel with the first energy storage element and the sixth and seventh switching units connected in parallel with the second energy storage element.

20 Claims, 9 Drawing Sheets

(56) References Cited

U.S. PATENT DOCUMENTS

| | | | |
|---|---|---|---|
| 2010/0141041 A1* | 6/2010 | Bose | H02M 7/487 307/82 |
| 2012/0068756 A1 | 3/2012 | Aiello et al. | |
| 2012/0243282 A1* | 9/2012 | Marquardt | H02M 7/49 363/132 |

FOREIGN PATENT DOCUMENTS

| | | | |
|---|---|---|---|
| DE | WO 2015036149 A1 * | 3/2015 | H02M 1/32 |
| EP | 1 501 180 A1 | 1/2005 | |
| EP | 2 161 825 A1 | 3/2010 | |
| JP | 2010-213562 A | 9/2010 | |
| WO | WO 2011/012174 A1 | 2/2011 | |
| WO | WO 2011/067120 A1 | 6/2011 | |

OTHER PUBLICATIONS

Lesnicar et al., "A new modular voltage source inverter topology", EPE 2003.

Marquardt et al., "New Concept for High Voltage-Modular Multi-level Converter", IEEE 2004, PESC 2004 Conference in Aachen, Germany.

* cited by examiner

BIPOLAR DOUBLE VOLTAGE CELL AND MULTILEVEL CONVERTER WITH SUCH A CELL

FIELD OF INVENTION

The present invention generally relates to converter cells. More particularly the present invention relates to a cell for use in a phase arm of a multilevel converter converting between alternating current (AC) and direct current (DC) as well as to such a multilevel converter.

BACKGROUND

Voltage source converters are of interest to use in a number of different power transmission environments. They may for instance be used as voltage source converters in direct current power transmission systems such as high voltage direct current (HVDC) and alternating current power transmission systems, such as flexible alternating current transmission system (FACTS). They may also be used as reactive compensation circuits such as Static VAR compensators.

In order to reduce harmonic distortion in the output of power electronic converters, where the output voltages can assume several discrete levels, so called multilevel converters have been proposed. In particular, converters where a number of cascaded converter cells, each comprising a number of switching units and one or two energy storage units in the form of DC capacitor have been proposed. These converters are also known as chain-link converters.

Converter cells in such a converter may for instance be of the half-bridge, full-bridge or clamped double cell type.

A half-bridge cell provides a unipolar voltage contribution to the converter and offers the simplest structure of the chain link converter. This type is described by Marquardt, 'New Concept for high voltage-Modular multilevel converter', IEEE 2004 and A. Lesnicar, R. Marquardt, "A new modular voltage source inverter topology", EPE 2003. This module is effective in that the number of components is low.

However, there are a few problems with the half-bridge topology in that the fault current blocking ability in the case of a DC fault, such as a DC pole-to-pole or a DC pole-to-ground fault, is limited and that it is unable to provide bipolar voltage contributions.

One way to address this is through the use of full-bridge cells. This type of cell is for instance described in WO 2011/012174. A converter using full-bridge cells will be able to both block fault currents caused by DC faults and are able to provide bipolar voltage contributions.

However, the use of full-bridge cells doubles the number of components compared with a half-bridge cell.

One way to reduce the number of components is through the use of clamped double cells or clamp-double submodules. These cells have two sections, where each section comprises an energy storage element having a positive and a negative end and a pair of switching units in parallel with the energy storage element. The junction between the switching units of a section furthermore provides a cell connection terminal. A further switching unit connects the negative end of one of the energy storage elements with the positive end of the other energy storage element. There are also two clamping diodes, one between the positive ends of both energy storage elements and one between the negative ends of the two energy storage elements. A description of the cell has also been made in WO 2011/067120. This type of cell is advantageous in that it has fewer components than the full-bridge cell and that it allows fault current limitation. However, the voltage contributions are also unipolar.

The modular multilevel converter is thus a promising topology for high-voltage high-power applications. By the series-connection of cells it can generate high-quality voltage waveforms with low harmonic distortion at low switching frequencies. The cells can thus be seen as low-voltage ac-dc converters with capacitive energy storages. These capacitive energy storages are a driving factor of the size, weight, and cost of the converter. For this reason it is important to ensure that the stored energy in the converter is distributed as evenly among the cells as possible. During nominal operation, large amounts of energy is moved between the arms in the converter.

It would therefore be of interest to obtain a cell requiring a lower number of components in the conduction path than the full-bridge cell, while still having the ability to provide bipolar voltage contributions and fault current blocking.

SUMMARY OF THE INVENTION

The present invention is directed towards providing cells that enable a reduction of the number of components in a multilevel converter to be made combined with providing fault current limitation and bipolar voltage contribution capability.

This object is according to a first aspect achieved through a cell for use in a phase arm of a multilevel converter converting between alternating current (AC) and direct current (DC). The cell comprises
a first section with
  a first group of series connected switching units, which first group is connected in parallel with a first energy storage element, where a junction between a first and a second switching unit of the first group forms a first cell connection terminal, and
a second section with
  a second group of series connected switching units, which second group is connected in parallel with a second energy storage element, where a junction between a third and a fourth switching unit of the second group forms a second cell connection terminal, and
an interconnecting section interconnecting the first and the second sections and comprising
  a third group of series-connected switching units, which third group comprises a fifth, sixth and seventh switching unit, where the fifth and sixth switching units are connected in parallel with the first energy storage element and the sixth and seventh switching units are connected in parallel with the second energy storage element.

The object is according to a second aspect achieved by a multilevel converter configured to convert between alternating current (AC) and direct current (DC). The multilevel converter comprises at least one phase arm with a number of cells between a DC pole and an AC terminal, where the cells comprise at least one cell according to the first aspect.

The present invention has a number of advantages. It provides a cell having low conduction losses because of a low number of components in the conduction path. The cell also provides a good fault current handling capability and has bipolar voltage contribution ability. All this functionality is obtained with a low number of components.

BRIEF DESCRIPTION OF THE DRAWINGS

The present invention will in the following be described with reference being made to the accompanying drawings, where FIG. 1 schematically shows a multilevel converter connected between two poles, FIG. 2 schematically shows the structure of a double voltage contribution cell that is used in the converter.

DETAILED DESCRIPTION OF THE INVENTION

In the following, a detailed description of preferred embodiments of the invention will be given.

Figure 1:
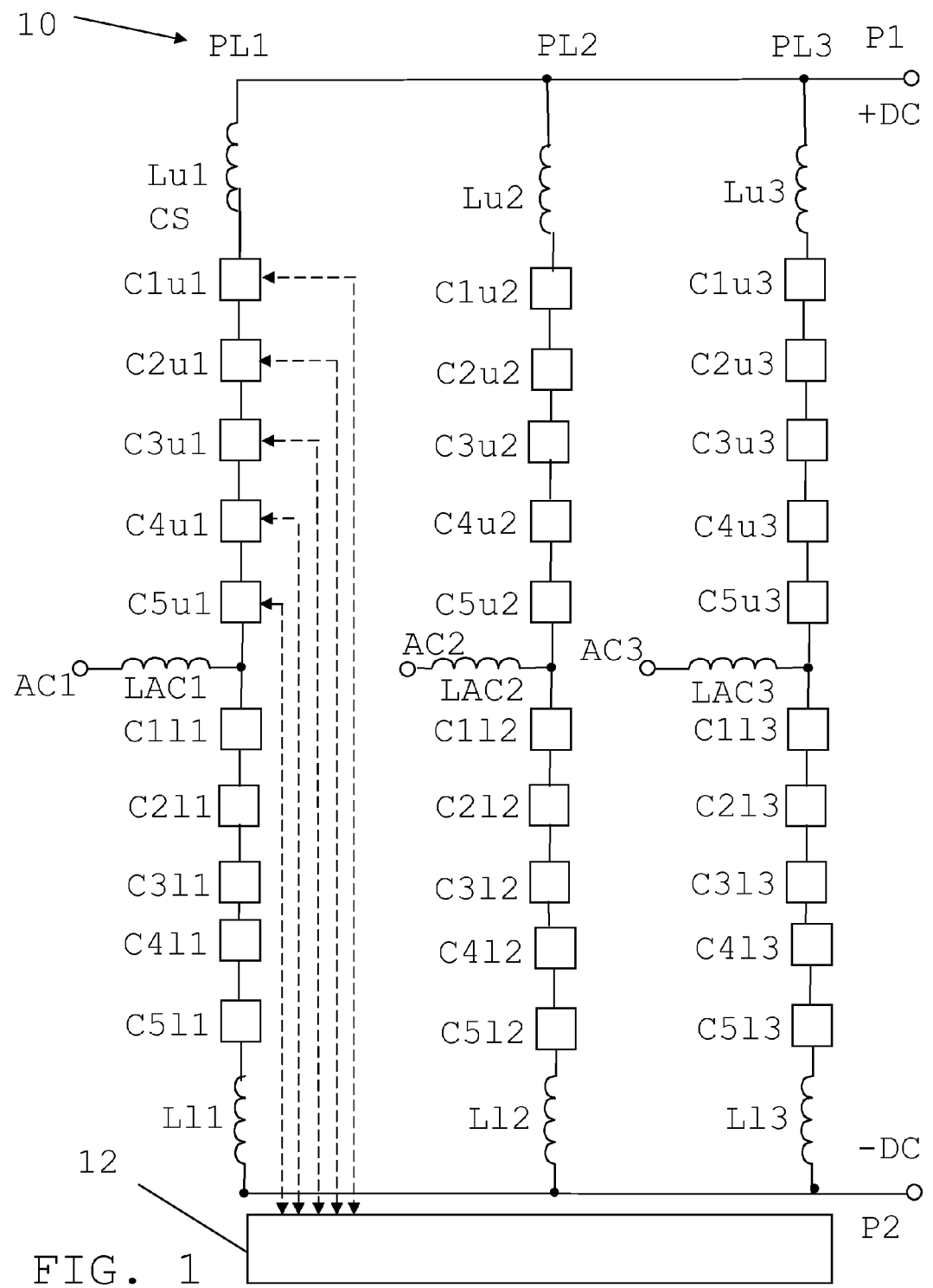

FIG. 1 shows a block schematic outlining an example of a voltage source converter 10, which may be provided as an interface between a direct current (DC) power system and an alternating current (AC) power system, such as an interface between AC and DC power transmission systems. A DC power transmission system may be a High Voltage Direct Current (HVDC) power transmission system and an AC system may be a flexible alternating current transmission system (FACTS). The voltage source converter 10 is a multilevel converter configured to convert between AC and DC. It here includes a group of branches in the form of phase legs connected in parallel between two DC poles P1 and P2 for connection to the DC transmission system. In the example given here there are three such branches or phase legs PL1, PL2, PL3 in order to enable connection to a three-phase AC transmission system. It should however also be realized that as an alternative there may be for instance only two phase legs. Each phase leg PL1, PL2 and PL3 has a first and second end point. In a converter of the type depicted in FIG. 1 the first end points of all the phase legs PL1, PL2 PL3 are connected to the first DC pole P1, while the second end points are connected to the second DC pole P2.

Each phase leg PL1, PL2, PL3 of the voltage source converter 10 further includes a lower and upper phase leg half, often denoted phase arm, and at the junction where the phase arms of a phase leg meet, there is provided an AC terminal. In the exemplifying voltage source converter 10 there is here a first phase leg PL1 having an upper phase arm and a lower phase arm, a second phase leg PL2 having an upper phase arm and a lower phase arm and a third phase leg PL3 having an upper phase arm and a lower phase arm. At the junction between the upper and lower phase arms of the first phase leg PL1 there is provided a first AC terminal AC1, at the junction between the upper and lower phase arms of the second phase leg PL2 there is provided a second AC terminal AC2 and at the junction between the upper and lower phase arms of the third phase leg PL3 there is provided a third AC terminal AC3. Each AC terminal AC1, AC2, AC3 is here connected to the corresponding phase leg via a respective inductor LAC1, LAC2, LAC3. Here each phase arm furthermore includes one current limiting inductor Lu1, Lu2, Lu3, L11, L12, and L13 connected to the corresponding DC pole P1 and P2. Each phase arm furthermore includes a number of cells.

As mentioned above, the voltage source converter 10 in FIG. 1 is only one example of a multilevel converter where the invention may be used. It is for instance possible to provide the three phase legs in series with each other between the two poles, where these then make up a first set of phase legs. It is then possible to provide a second set of series-connected phase legs in parallel with the first set. In this case the midpoints of the phase legs of the first set forms primary AC terminals and the midpoints of the phase legs of the second set forms secondary AC terminals for the three phases.

Yet another realization of a multilevel converter is a static VAR compensator.

The phase arms of the voltage source converter 10 in the example in FIG. 1 comprise cells. A cell is a unit that may be switched for providing a voltage that contributes to the voltage on the corresponding AC terminal. A cell then comprises one or more energy storage elements, for instance in the form of capacitors, and the cell may be switched to provide a voltage contribution corresponding to the voltage of the energy storage element or a zero voltage contribution. In order to perform the switching each cell comprises switching units, such as pairs of transistors with antiparallel diodes. When more than one energy storage element is included in a cell it is possible with even further voltage contributions.

The cells are with advantage connected in series or in cascade in a phase arm.

In the example given in FIG. 1 there are five series-connected or cascaded cells in each phase arm. Thus the upper phase arm of the first phase leg PL1 includes five cells C1$u$1, C2$u$1, C3$u$1, C4$u$1 and C5$u$1, while the lower phase arm of the first phase leg PL1 includes five cells C1/1, C2/1, C3/1, C4/1 and C5/1. In a similar fashion the upper phase arm of the second phase leg PL2 includes five cells C1$u$2, C2$u$2, C3$u$2, C4$u$2 and C5$u$2, while the lower phase arm of the second phase leg PL2 includes five cells C1/2, C2/2, C3/2, C4/2 and C5/2. Finally the upper phase arm of the third phase leg PL3 includes five cells C1$u$3, C2$u$3, C3$u$3, C4$u$3 and C5$u$3 while the lower phase arm of the third phase leg PL3 includes five cells C1/3, C2/3, C3/3, C4/3 and C5/3. The number of cells provided in FIG. 1 is only an example. It therefore has to be stressed that the number of cells in a phase arm may vary. It is often favorable to have many more cells in each phase arm, especially in HVDC applications. A phase arm may for instance comprise hundreds of cells. There may however also be fewer.

Control of each cell in a phase arm is normally done through providing the cell with a control signal directed towards controlling the contribution of that cell to meeting a reference voltage. The reference voltage may be provided for obtaining a waveform on the AC terminal of a phase leg, for instance a sine wave. In order to control the cells there is therefore a control unit 12.

The control unit 12 is provided for controlling all the phase arms of the converter. However, in order to simplify the figure only the control of the upper phase arm of the first phase leg PL is indicated in FIG. 1.

The other phase arms are controlled in a similar manner in order to form output waveforms on the three AC terminals AC1, AC2 and AC3.

The first DC pole P1 furthermore has a first potential +DC that may be positive, while the second DC pole P2 has a second potential −DC that may be negative. The first pole P1 may therefore also be termed a positive pole, while the second pole P2 may be termed negative pole.

It should also be realized that the inductors are optional.

The modular multilevel converter is a promising topology for high-voltage high-power applications. By the series-connection of cells it can generate high-quality voltage waveforms with low harmonic distortion at low switching frequencies. The cells are low-voltage ac-dc converters with capacitive energy storage elements. These capacitive energy storage elements are a driving factor of the size, weight, and cost of the converter.

Traditionally, the cells used in the converter 10 are of the previously mentioned half-bridge, full-bridge and clamped double cell types. However, they all have some shortcomings.

The half-bridge cell has the advantage that it requires the least number of semiconductors. However, it is unable to block fault currents due to DC faults and to provide bipolar voltage contributions.

Therefore, the full-bridge cell may appear as a suitable alternative as it can block both positive and negative voltages. The full-bridge cell is bipolar in that it is able to insert both positive and negative voltages, which makes it possible to operate the converter with modulation indices above unity. A disadvantage with the full-bridge cell is, however, that it requires twice the number of semiconductors compared to the half-bridge cell.

This makes the double-clamped cell an attractive choice. The combined power rating of the semiconductors is lower compared to the full-bridge cell but is still able to block both positive and negative currents. The double-clamped cell can, however, not insert negative voltages, which means that the amplitude of the alternating voltage will be limited by the dc-link voltage.

One reason for wanting to have bipolar voltage contribution ability is to ensure that energy stored in the converter is distributed as evenly among the phase arms as possible. During nominal operation, large amounts of energy is moved between the phase arms in the converter. These energy oscillations can, however, be reduced or even eliminated if cells that can insert a negative voltage are used.

By means of embodiments described herein it is possible to target three of the aforementioned problems at the same time. That is, dc-short circuit limitation, capacitor voltage balancing, and the possibility to insert negative voltages which can reduce the size of the cell capacitors by increasing the modulation index above unity.

An embodiment of the invention therefore provides a new cell type to be used in a multilevel converter. According to another embodiment a multilevel converter comprising at least one such new cell is provided.

By using the new type of cell, the energy variations, and thus the size of the capacitors, can be significantly reduced.

Figure 2:
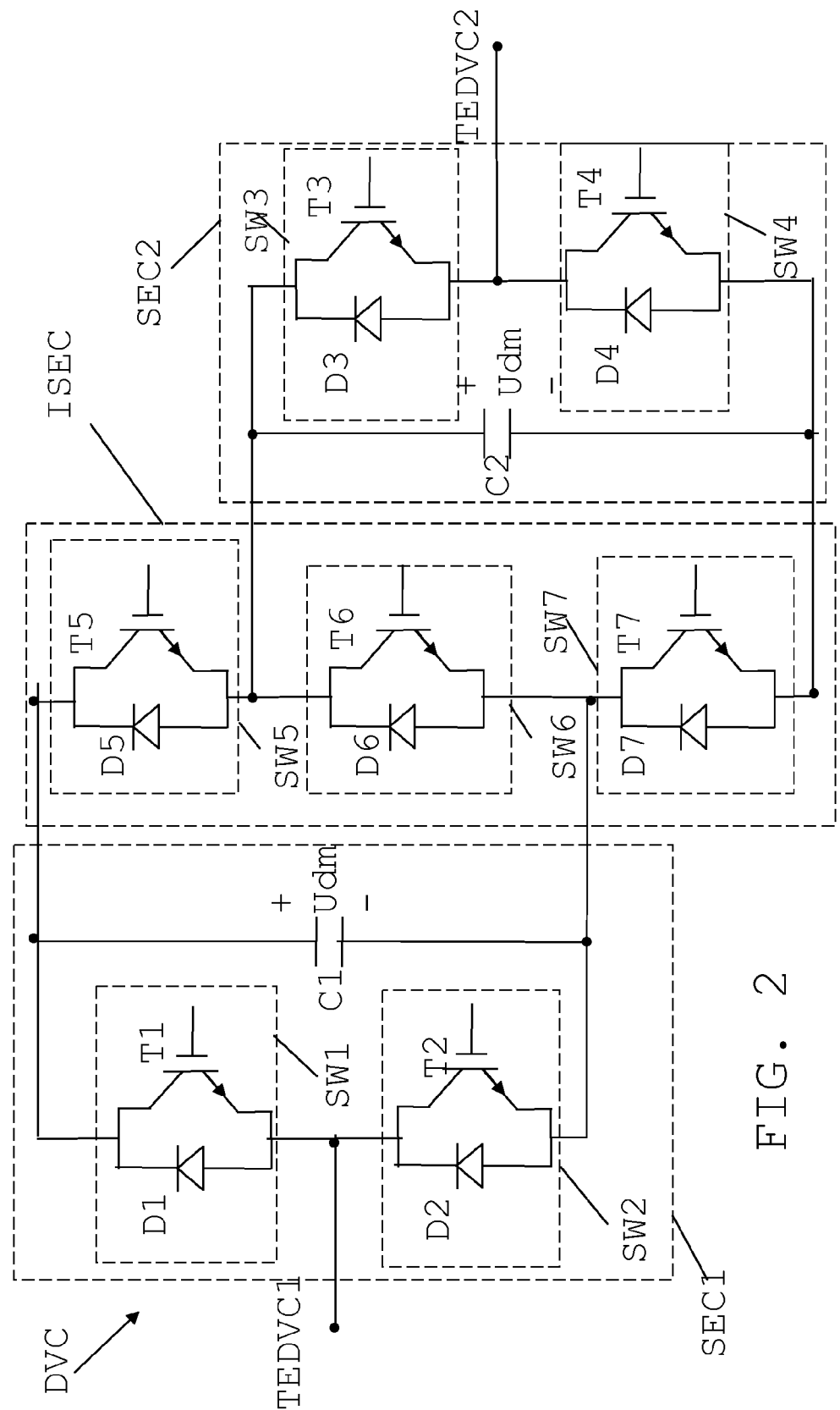

FIG. 2 shows a double voltage contribution cell DVC that is used in the converter 10.

The cell is designated as a double voltage contribution cell, because it is a cell with the ability to provide two energy storage element voltages for contributing to the forming of an AC voltage on an AC terminal of a phase leg. It thus has two energy storage elements that are used in the cell in order to provide voltages for the converter. The voltage contributions of the cell can furthermore be bipolar, i.e. both positive and negative. The cell may therefore also be termed bipolar double voltage contribution cell.

The cell DVC comprises a first section SEC1 comprising a first energy storage element C1, here in the form of a first capacitor C1, which is connected in parallel with a first group of switching units. This first energy storage element C1 provides a voltage Udm, and therefore has a positive and negative end, where the positive end has a higher potential than the negative end. The first group includes two series-connected switching units SW1 and SW2 (shown as dashed boxes). These two switching units SW1 and SW2 may be realized in the form of a switching element, which may be an IGBT (Insulated Gate Bipolar Transistor) transistor, together with an anti-parallel unidirectional conducting element, such as a diode or a part of a circuit or component acting as a diode. In FIG. 2 the first switching unit SW1 is therefore provided as a first transistor T1 with a first anti-parallel diode D1. The first diode D1 is connected between the emitter and collector of the transistor T1 and has a direction of conductivity from the emitter to the collector as well as towards the positive end of the first energy storage element C1. The second switching unit SW2 is provided as a second transistor T2 with a second anti-parallel diode D2. The second diode D2 is connected in the same way in relation to the first energy storage element C1 as the first diode D1, i.e. conducts current towards the positive end of the first energy storage element C1. The first switching unit SW1 is furthermore connected to the positive end of the first energy storage element C1, while the second switching unit SW2 is connected to the negative end of the first energy storage element C2.

In the cell DVC there is furthermore a second section SEC2. The second section comprises a second group of switching units connected in series with each other. This second group of switching units is connected in parallel with a second energy storage element C2. The second group includes a third switching unit SW3 and a fourth switching unit SW4. Also these may be realized in the form of a switching element, which may be an IGBT (Insulated Gate Bipolar Transistor) transistor, together with an anti-parallel unidirectional conducting element. The third switching unit SW3 is in this case provided through a third transistor T3 with anti-parallel third diode D3 and the fourth switching unit SW4 is provided through a fourth transistor T4 with fourth anti-parallel diode D4. Also this second energy storage element C2 provides a voltage Udm, with advantage the same voltage as the first energy storage element, and therefore has a positive and negative end, where the positive end has a higher potential than the negative end. The fourth switching unit SW4 is in this case connected to the negative end of the second energy storage element C2, while the third switching unit SW3 is connected to the positive end of the second energy storage element C2. The current conducting direction of both diodes D3 and D4 is towards the positive end of the second energy storage element C2.

Between the first and second section SEC1 and SEC2 there is furthermore an interconnecting section ISEC interconnecting the first and the second sections SEC1 and SEC2. This interconnecting section ISEC comprises a third group of series-connected switching units, which group comprises a fifth, sixth and seventh switching unit SW5, SW6 and SW7. Also these may be realized in the form of a switching element, which may be an IGBT (Insulated Gate Bipolar Transistor) transistor, together with an anti-parallel unidirectional conducting element. The fifth switching unit SW5 is in this case provided through a fifth transistor T5 with anti-parallel fifth diode D5, the sixth switching unit SW6 is provided through a sixth transistor T6 with anti-parallel sixth diode D6 and the seventh switching unit SW7 is provided through a seventh transistor T7 with anti-parallel seventh diode D7. The fifth, sixth and seventh switching units SW5, SW6 and SW7 thereby form a string or a branch, which branch or string stretches from the positive end of the first energy storage element C1 to the negative end of the second energy storage element C2. This means that a first end of the third group of switching units, i.e. a first end of the string or branch, is connected to the positive end of the first energy storage element C1, while a second end of the third group of switching units, i.e. a second end of the string or branch, is connected to the negative end of the second energy storage element C2. The fifth and sixth switching units SW5 and SW6 are furthermore connected in parallel with the first energy storage element C1 and the sixth and seventh energy storage elements SW6 and SW7 are at the same time connected in parallel with the second energy storage element C2. This means that the junction between the fifth and sixth switching units SW5 and SW6 is connected to the positive end of the second energy storage element C2 and the junction between the sixth and seventh switching unit SW6 and SW7 is connected to the negative end of the first energy storage element C1. The diodes D5, D6 and D7 of the interconnecting section ISEC all have a direction of current conduction towards the positive end of the first energy storage element C1.

This cell DVC comprises a first cell connection terminal TEDVC1 and a second cell connection terminal TEDVC2, each providing a connection for the cell to a phase arm. The first cell connection terminal TEDVC1 provides a connection to a junction between the first and the second switching units SW1 and SW2, while the second cell connection terminal TEDVC2 provides a connection to a junction between the third and fourth switching units SW3 and SW4. The junction between the first and the second switching units SW1 and SW2 thus provides or forms the first cell connection terminal TEDVC1 and the junction between the third and fourth switching units SW3 and SW4 provides or forms the second cell connection terminal TEDVC2. In case the cell is to be placed in a positive phase arm, the first cell connection terminal TEDVC1 may face the first pole and thereby couple the cell to the first pole, while the second cell connection terminal TEDVC2 may face the AC terminal of the phase leg and thereby couple the cell to this AC terminal. If being connected in the negative phase arm, the second cell connection terminal TEDVC2 may face the second pole and thereby couple the cell to the second pole, while the first cell connection terminal TEDVC1 may face the AC terminal of the phase leg, and thereby couple the cell to this AC terminal. This type of connection is a preferred connection of the cell into a phase arm. However, it should be realized that it is possible to also connect the cell into a phase arm in the opposite way, i.e. with the second cell connection terminal TEDVC2 facing the first pole and the first cell connection terminal TEDVC1 facing the AC terminal if connected in an upper phase arm and with the second cell connection terminal TEDVC2 facing the AC terminal and the first cell connection terminal TEDVC1 facing the second pole if connected in the negative phase arm.

The expression couple or coupling is intended to indicate that more components, such as more cells and inductors, may be connected between the pole and the cell, while the expression connect or connecting is intended to indicate a direct connection between two components such as two cells. There is thus no component in-between two components that are connected to each other.

The cell DVC has a number of operational states, in order to be employed in the forming of an AC voltage on the AC terminal of a phase leg. Four of these states may be preferred.

The switching units of the double voltage contribution cell are thus controllable to provide a number of AC voltage contribution states when operated in a voltage forming operating mode.

Figure 3:
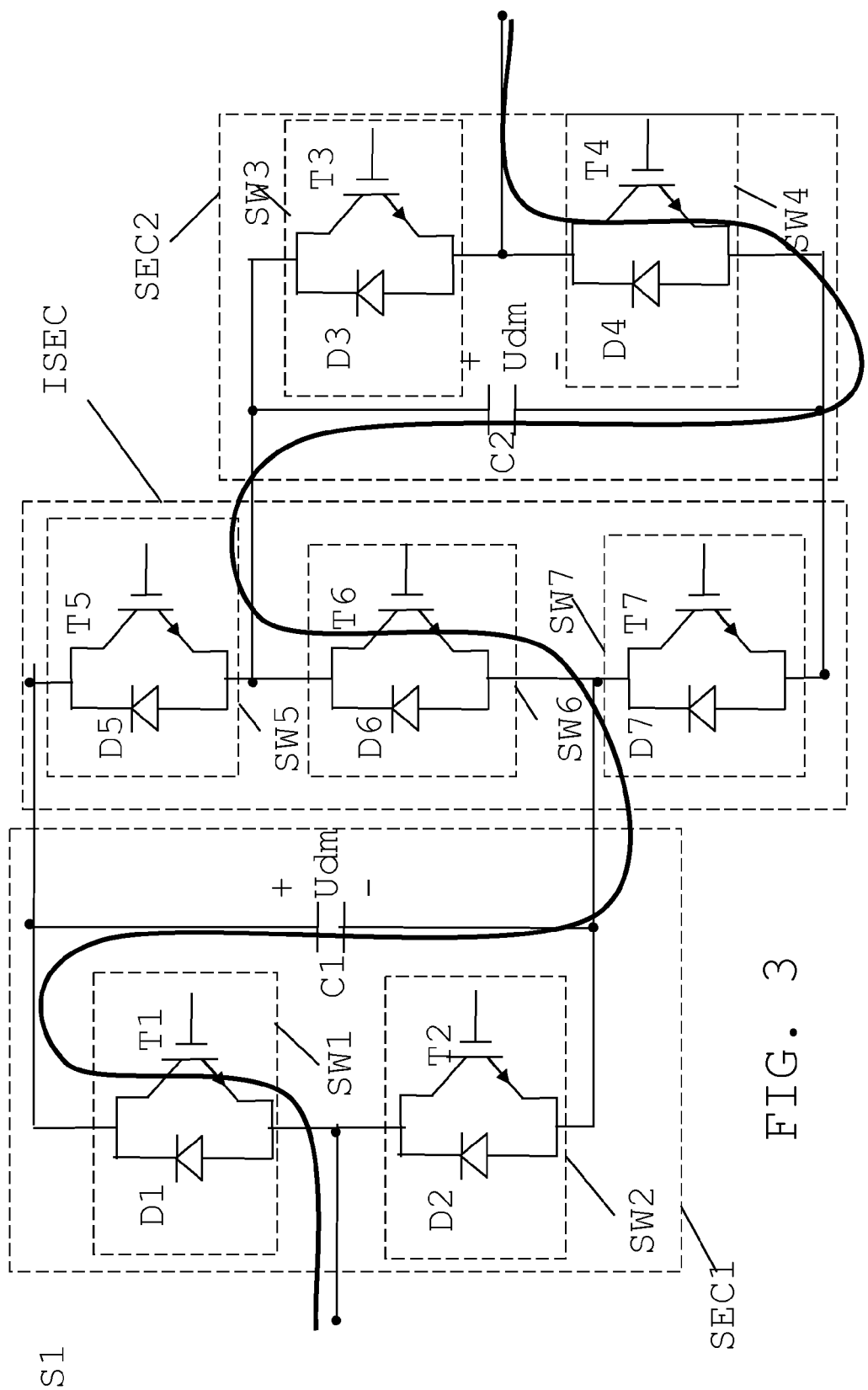
FIG. 3 shows a current path through the double voltage contribution cell in a first switching state.

In a first state S1, the cell DVC provides a voltage contribution based on both the first and the second energy storage elements C1 and C2 and more particularly a voltage contribution that is a sum of the voltages provided by the first and second energy storage elements C1 and C2. The first state is a first type of voltage contribution state, which is a positive voltage contribution state. The voltage contribution of the first state is thus positive and in this case provided as a voltage contribution of +2Udm. In order to obtain this first state, the first, fourth and sixth switching units SW1, SW4 and SW6 are on while the second, third, fifth and seventh switching units SW2, SW3, SW5 and SW7 are off. More particularly, the first, fourth and sixth switching elements T1, T4 and T6 of the first, fourth and sixth switching units SW1, SW4 and SW6 are on while the second, third, fifth and seventh switching elements T2, T3, T5 and T7 of the second, third, fifth and seventh switching units SW2, SW3, SW5 and SW7 are off. FIG. 3 shows a current path between the first and the second cell connection terminal in this first state. As can be seen in FIG. 3, this state causes the first and second energy storage elements C1 and C2 to be connected in series between the first and second cell connection terminals TEDVC1 and TEDVC2, with the positive end of the first energy storage element C1 connected to the first cell connection terminal TEDVC1 and the negative end of the second energy storage element C2 connected to the second cell connection terminal TEDVC2. The switching units are thus controllable to connect the energy storage elements between the first and second cell connection terminals with a first orientation, which is with the positive end facing the first cell connection terminal and the negative end facing the second cell connection terminal.

When this highest voltage level 2*Udm is used, the two capacitors C1 and C2 are thus connected in series between the connection terminals TEDVC1 and TEDVC2 of the cell DVC. It is observed that a current passing through the cell is conducted through three semiconductors, which is one more compared to the half-bridge cell, one less than the full-bridge cell, and the same as in the double-clamped cell.

Figure 4:
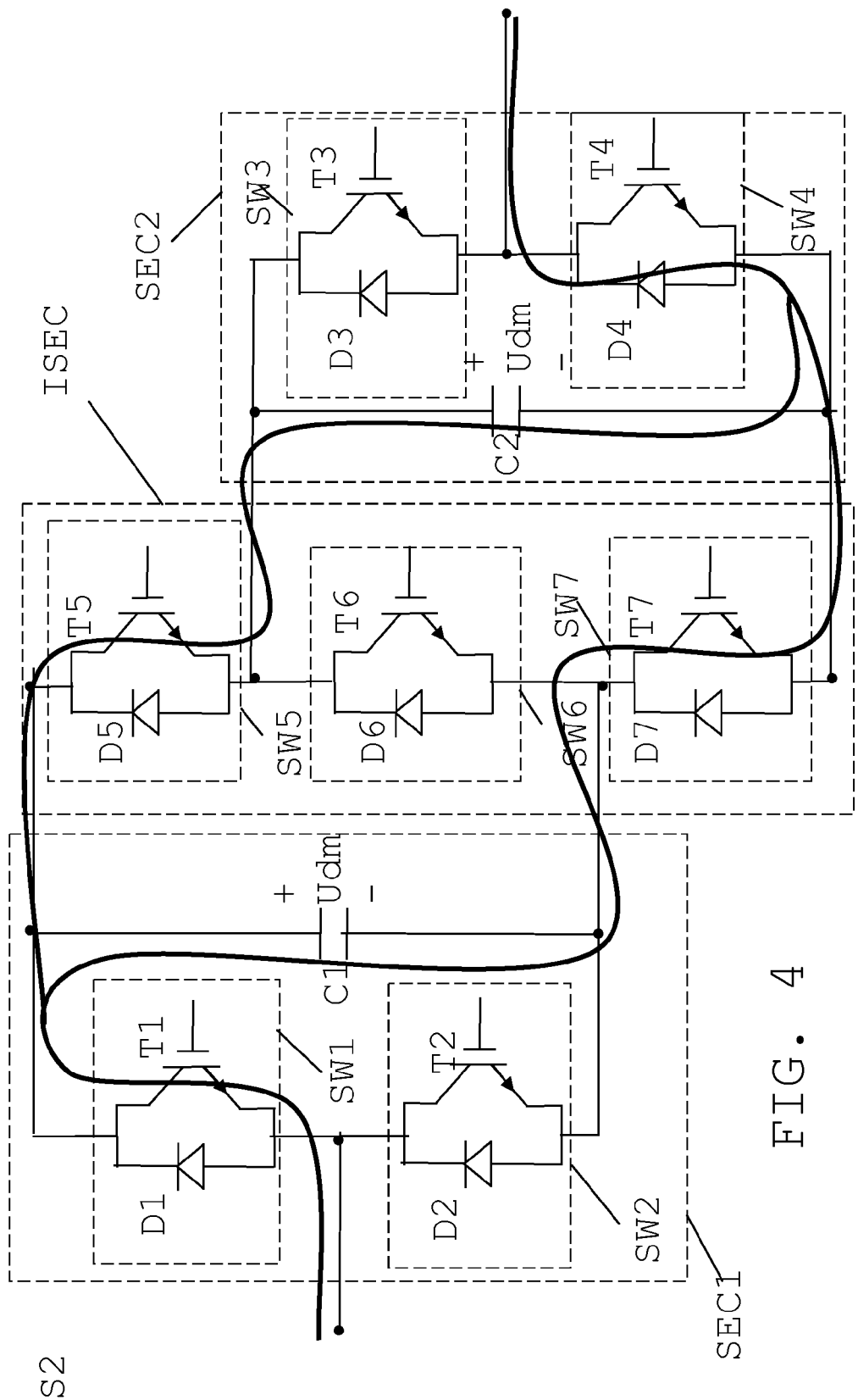
FIG. 4 shows a current path through the double voltage contribution cell in a second switching state.

In a second voltage contribution state S2, which is also a state of the first type, the cell DVC also provides a voltage contribution of both the first and the second energy storage elements C1 and C2. However in this case the voltage contribution is a voltage contribution caused by the first energy storage element C1 being connected in parallel with the second energy storage element C2. Also this voltage contribution of the second state is a positive voltage contribution and is obtained when the first, fourth, fifth and seventh switching units SW1, SW4, SW5 and SW7 are on while the second, third and sixth switching units SW2, SW3 and SW6 are off. The second state is more particularly obtained when the first, fourth, fifth and seventh switching elements T1, T4, T5 and T7 of the first, fourth, fifth and seventh switching units SW1, SW4, SW5 and SW7 are on while the second, third and sixth switching elements T2, T3 and T6 of the second, third and sixth switching units SW2, SW3 and SW6 are off. FIG. 4 shows a current path between the first and the second cell connection terminal in this second state. As can be seen in FIG. 4, this state causes the first and second energy storage elements C1 and C2 to be connected in parallel between the first and second cell connection terminals TEDVC1 and TEDVC2, with the first orientation, here through the positive ends of the energy storage elements C1 and C2 being connected to the first cell connection terminal TEDVC1 and the negative ends of the energy storage elements C1 and C2 connected to the second cell connection terminal TEDVC2. The second state provides an intermediate voltage level of +Udm. The second state also ensures that the charge of the cell is distributed evenly between the two capacitors, which improves the balancing process at low switching frequencies. It is observed that the current is conducted through SW5 and SW7 in parallel meaning that SW5 and SW7 are only conducting half of the arm current each. This also means that a current passing through the cell also here only passes three semiconductors.

Figure 5:
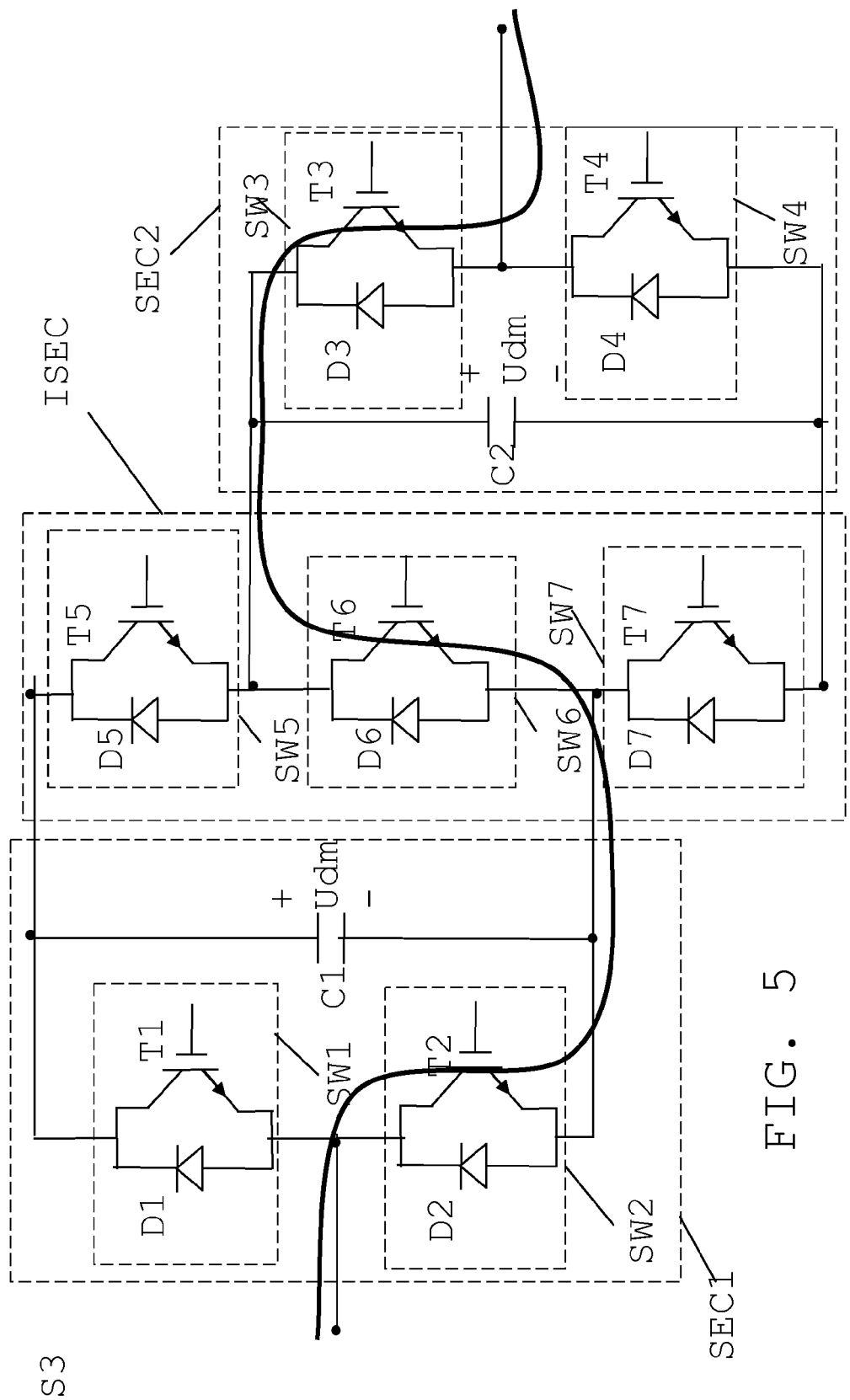
FIG. 5 shows a current path through the double voltage contribution cell in a third switching state.

In order to provide a third state S3, where the cell DVC provides a zero voltage contribution, the second, third and sixth switching units SW2, SW3 and SW6 are on, while the first, fourth, fifth and seventh switching units SW1, SW4, SW5 and SW7 are off. The third state is more particularly obtained when the second, third and sixth switching elements T2, T3 and T6 of the second, third and sixth switching units SW2, SW3 and SW6 are on, while the first, fourth, fifth and seventh switching elements T1, T4, T5 and T7 of the first, fourth, fifth and seventh switching units SW1, SW4, SW5 and SW7 are off. FIG. 5 shows a current path between the first and the second cell connection terminal in this third state. As can be seen in FIG. 5, this state causes the first and second cell connection terminals to be interconnected at the same potential. Both of the capacitors C1 and C2 are thus bypassed in this state. Also in this state a current passing through the cell only passes three semiconductors.

Figure 6:
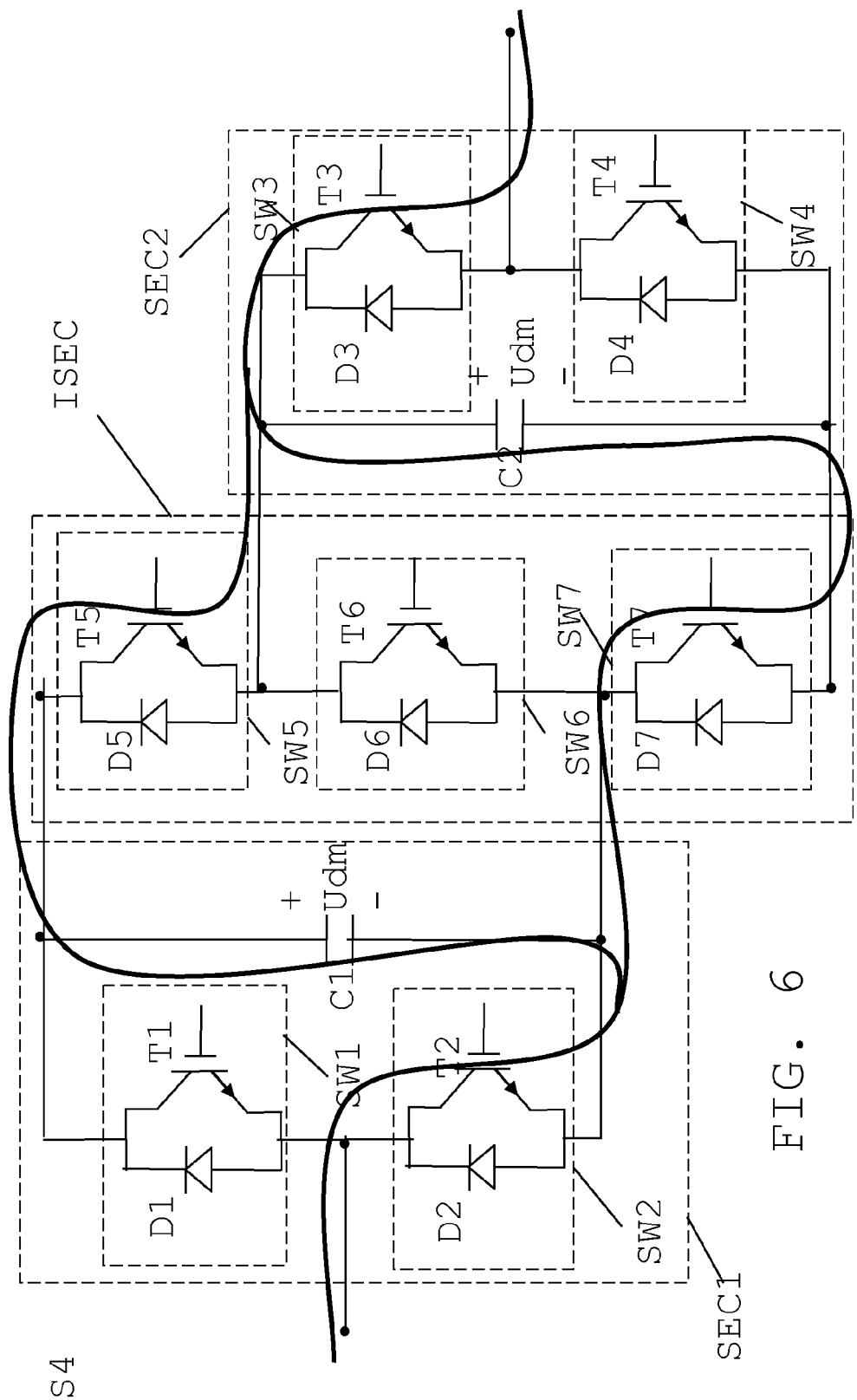
FIG. 6 shows a current path through the double voltage contribution cell in a fourth switching state.

A fourth state S4 provides, just as the second state, a voltage contribution of both the first and the second energy storage elements C1 and C2 caused by the first energy storage element C1 being connected in parallel with the second energy storage element C2. However this voltage contribution of the fourth state is a second type of voltage contribution state providing a second type of voltage contribution that is a negative voltage contribution. The voltage contribution is in this case a voltage contribution of −Udm and is obtained when the second, third, fifth and seventh switching units SW2, SW3, SW5 and SW7 are on, while the first, fourth, and sixth switching units SW1, SW4 and SW6 are off. The fourth state is more particularly obtained when the second, third, fifth and seventh switching elements T2, T3, T5 and T7 of the second, third, fifth and seventh switching units SW2, SW3, SW5 and SW7 are on, while the first, fourth, and sixth switching elements T1, T4 and T6 of the first, fourth and sixth switching units SW1, SW4 and SW6 are off. FIG. 6 shows a current path between the first and the second cell connection terminal in this fourth state. As can be seen in FIG. 6, this state is thus caused by the first and second energy storage elements C1 C2 being connected in parallel between the first and second cell connection terminals TEDVC1 and TEDVC2, with the negative ends of the energy storage elements C1 and C2 connected to the first cell connection terminal TEDVC1 and the positive ends of the energy storage elements C1 and C2 connected to the second cell connection terminal TEDVC2. The switching units are thus controllable to connect the energy storage elements between the first and second cell connection terminals with a second orientation, which is with the negative end facing the first cell connection terminal and the positive end facing the second cell connection terminal. As can be seen this second orientation is an orientation that is the opposite of the first orientation.

It may be seen that the switching units SW5 and SW7 are conducting in parallel also when the negative voltage level is used. This means that the current rating of SW5 and SW7 is only half of the arm current. Consequently, in terms of equally rated semiconductors, the devices in the double voltage contribution cell DVC corresponds to 6 full switches rated for the arm current. As can be seen a current passing through the cell also here only passes three semiconductors. As there are two capacitors in the double voltage contribution cell DVC, this corresponds to 3 switches per capacitor which places the double voltage contribution cell DVC exactly between the half-bridge and the full-bridge in terms of equally rated semiconductors.

There exist more states where a voltage contribution corresponding to a single energy storage element may be inserted, both with negative and positive polarity, between the two cell connection terminals as well as states when zero voltages are provided.

The table below summarizes some of the different switching states and the corresponding voltage contributions.

| State | Inserted C | SW1 | SW2 | SW3 | SW4 | SW5 | SW6 | SW7 |
|---|---|---|---|---|---|---|---|---|
| S1 | C1 + C2 | 1 | 0 | 0 | 1 | 0 | 1 | 0 |
| S2 | C1//C2 | 1 | 0 | 0 | 1 | 1 | 0 | 1 |
| S3 | 0 | 0 | 1 | 1 | 0 | 0 | 1 | 0 |
| S4 | −(C1//C2) | 0 | 1 | 1 | 0 | 1 | 0 | 1 |
| S5 | C1 | 1 | 0 | 1 | 0 | 0 | 1 | 0 |
| S6 | C2 | 0 | 1 | 0 | 1 | 0 | 1 | 0 |
| S7 | −C1 | 0 | 1 | 1 | 0 | 1 | 0 | 0 |
| S8 | −C2 | 0 | 1 | 1 | 0 | 0 | 0 | 1 |

There also exist additional zero voltage states, for instance when SW1, SW3 and SW5 are on or when SW2, SW4 and SW7 are on.

It is observed that the different switching units may have different switching frequencies. In general, if the four aforementioned preferred switching states are cycled, the switching frequency of SW5, SW6, and SW7 will be twice as high compared to SW1, SW2, SW3 and SW7. For bipolar devices such as IGBTs this could possibly be disadvantageous. This could, however, be solved by using SiC-devices, i.e. devices of Silicon Carbide, where the switching frequency is not so critical.

Figure 7:
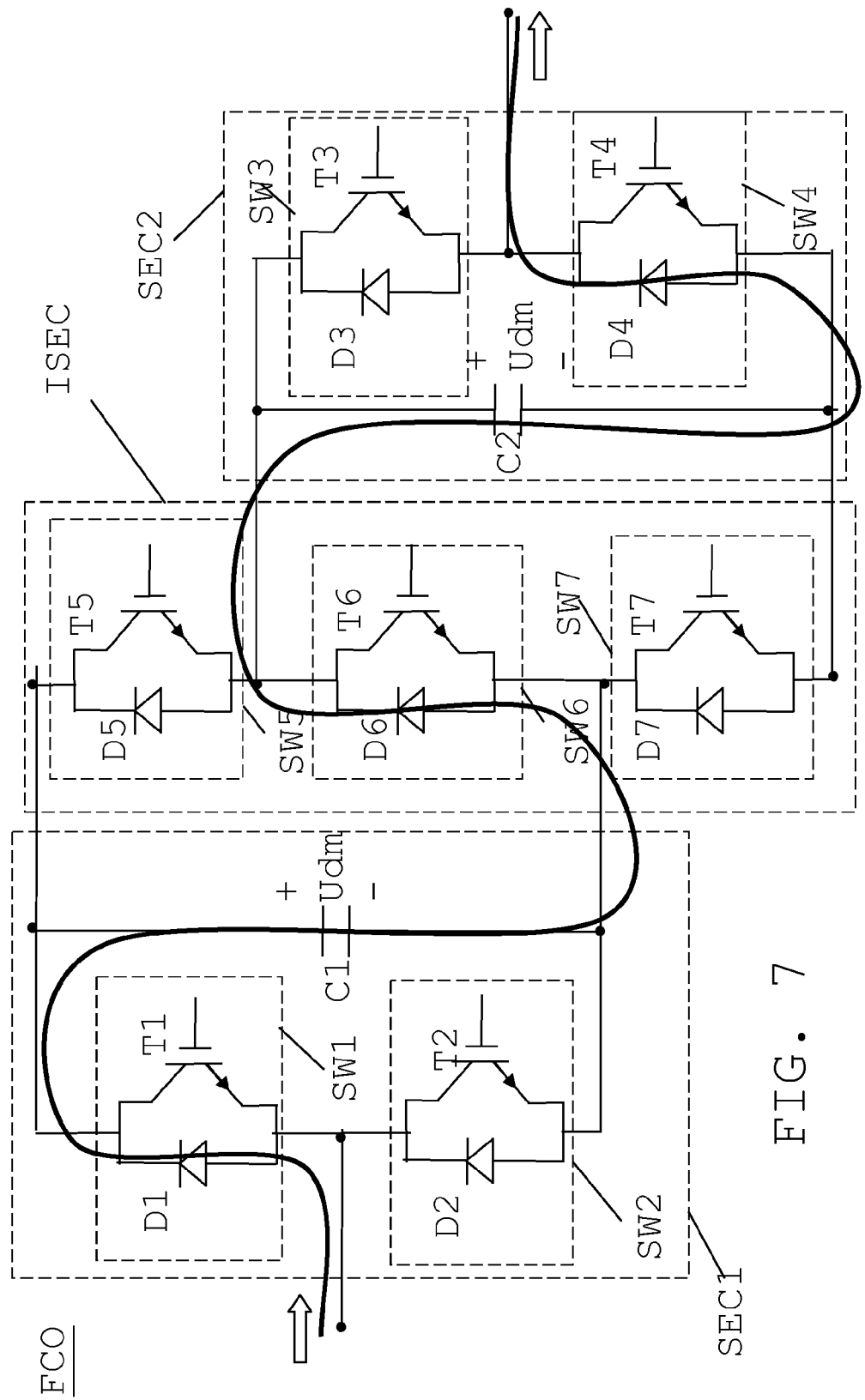
FIG. 7 shows a first fault current path through the double voltage contribution cell during fault current operation.

Finally, with regard to the double voltage contribution cell DVC there is a fault current operation, for instance due to DC faults, like pole-to-ground faults or pole-to-pole faults. FIG. 7 shows a first fault current path through the double voltage contribution cell during fault current operation and FIG. 8 shows a second fault current path through the double voltage contribution cell during fault current operation.

In fault current operation FCO all the switching elements T1, T2, T3, T4, T5, T6 and T7 of all the sections SEC1, SEC2 and ISEC are turned off. They are thus turned off if a fault current due to a DC fault runs through the phase arm, where a DC fault may be a pole-to-pole fault or a pole-to-ground fault. That is, when a failure occurs, all of the switching units are turned off.

If a fault current enters the first cell connection terminal TEDVC1, as can be seen in FIG. 7, it will then run via the first diode D1 of the first switching unit SW1, through the first energy storage element C1, through the sixth diode D6 of the sixth switching unit SW6, through the second energy storage element C2, through the fourth diode D4 of the fourth switching unit SW4 and out from the cell DVC via the second cell connection terminal TEDVC2. It can in this way be observed that the cell inserts the energy storage elements C1 and C2 in series in the fault current path, which provides a fault current limitation. A positive current will thus be conducted through the diodes in such a way that the capacitors appear to be series connected.

Figure 8:
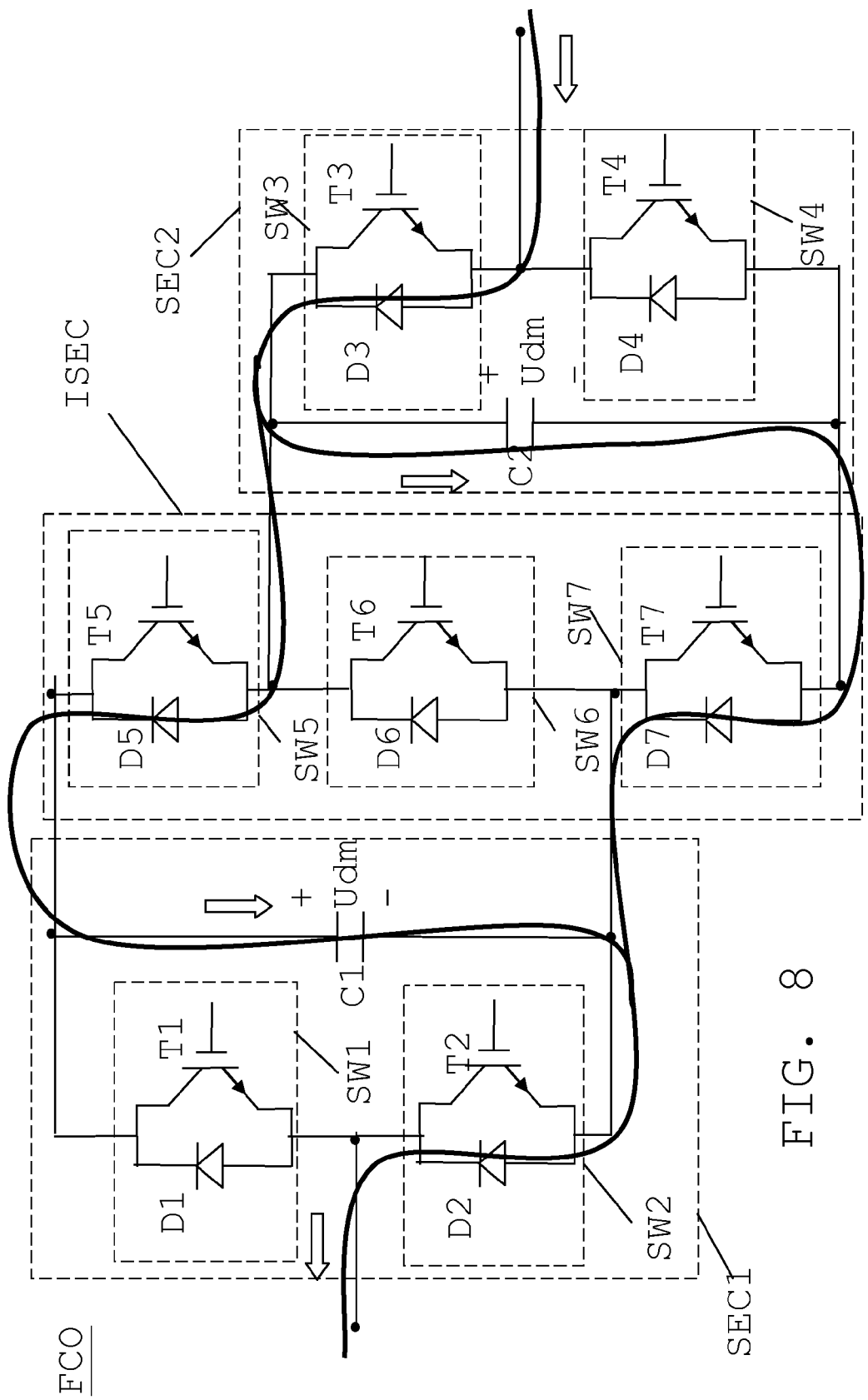
FIG. 8 shows a second fault current path through the double voltage contribution cell during fault current operation.

If a fault current enters the second cell connection terminal TEDVC2, as can be seen in FIG. 8, it will then run via the third diode D3 of the third switching unit SW3 in parallel over the first and second energy storage elements C1 and C2 via the fifth and seventh diodes D5 and D7 of the fifth and seventh switching units SW5 and SW7 through the second diode D2 of the second switching unit SW2 and out from the cell DVC via the first cell connection terminal TEDVC1. It can in this way be observed that the cell inserts the two energy storage elements in parallel in the fault current path, which likewise provides a fault current limitation. A negative current will in a similar manner be directed through the diodes in such a way that the current is charging the capacitors C1 and C2 as if they were connected in parallel.

The proposed cell requires more semiconductors than the double-clamped cell. However, if the preferred operational states are used, which are all that are needed for providing the various voltage contributions, a current path will comprise the same amount of semiconductors as the double-clamped cells. The conduction losses are thus the same. Furthermore, when compared with the full-bride cell, the combined power rating of the semiconductors is still lower than for the full-bridge cell.

The double voltage contribution cell may be considered to be an extension of the double-clamped cell. This makes the double voltage contribution cell into a 4-level cell, with two positive voltage levels, one zero voltage level, and one negative voltage level.

In order to ensure that the correct voltage is inserted, the variations in the capacitor voltages should be taken into account. The control of the alternating voltage is straightforward and can easily be performed if the control unit 12 is a feed-forward controller. It is also possible to control the time average of the capacitor voltages. The sum of the capacitor voltages in each arm should, however, always be higher than the requested voltage that should be inserted in the corresponding arm. The sum of the capacitor voltages in the upper arm may be denoted $v_{cu}^{\Sigma}$ and may also be referred to as the available voltage in the upper arm. Similarly, the sum of the capacitor voltages in the lower arm may be denoted $v_{cl}^{\Sigma}$ and may be referred to as the available voltage in the lower arm.

In order to simplify the analysis, only the peak-value of the inserted voltage may be considered as this describes the theoretical minimum for the voltage rating of each arm. The peak-value of the inserted voltage is referred to as $\hat{V}_i$ and is given by $$\hat{V}_i = \tfrac{1}{2} V_d + \hat{V}_s \quad (1)$$

where $V_d$ is the pole-to-pole voltage of the dc link and $\hat{V}_s$ is the peak value of the alternating voltage at the AC terminal. The voltage $\hat{V}_s$ can be related to $V_d$ as $$\hat{V}_s = \frac{m}{2} V_d \quad (2)$$

where m is the modulation index. Substituting $V_d$ in (1) with (2) gives $$\hat{V}_i = \tfrac{1}{2}(1+m) V_d \quad (3)$$

The semiconductors must be rated for the peak value of the current that is flowing through each arm. The arm currents can be considered to be sum of an alternating component related to the AC side and a circulating component flowing between the DC poles. As it is possible to control the circulating current, it can be assumed that the circulating current is a direct current. The peak-value of the arm currents can then be expressed as $$\hat{I}_{arm} = I_d + \tfrac{1}{2} \hat{I}_s \quad (4)$$

where $I_d$ is the circulating current and $\hat{I}_s$ is the peak value of the AC side current. The direct current $I_d$ can be expressed as a function of the modulation index and the amplitude of the alternating current $$I_d = \tfrac{1}{4} \hat{I}_s m \cos(\phi) \quad (5)$$

Substituting $I_d$ in (4) with (5) gives $$\hat{I}_{arm} = (\tfrac{1}{4} m \cos(\phi) + \tfrac{1}{2}) \hat{I}_s \quad (6)$$

The combined power rating of the semiconductors can be expressed in relation to the power transfer capability of the converter. Assuming a sinusoidal voltage at the AC terminal, the apparent power transfer per each phase leg can be expressed as $$S_{ph} = \frac{\hat{V}_s \hat{I}_s}{2} \quad (7)$$

Substituting $\hat{V}_s$ in (7) with (2) gives $$S_{ph} = \frac{m V_d \hat{I}_s}{4} \quad (8)$$

The combined power rating of the semiconductors can be found by first calculating the power rating of each arm and then multiplying the results with the number of semiconductors per capacitor. The power rating of one arm can be expressed as $$\hat{P}_{arm} = \hat{V}_i \hat{I}_{arm} \quad (9)$$

Substituting (3) and (6) in (9) yields $$\hat{P}_{arm} = \tfrac{1}{2}(1+m)(\tfrac{1}{4} m \cos(\phi) + \tfrac{1}{2}) \hat{I}_s V_d \quad (10)$$

The power rating per transferred MVA is found by dividing $\hat{P}_{arm}$ in (10) with $S_{ph}$ in (8). Accordingly, $$\hat{P}_{arm} = \frac{1}{m}(1+m)\left(\frac{1}{2} m \cos(\varphi) + 1\right) \quad (11)$$

Figure 9:
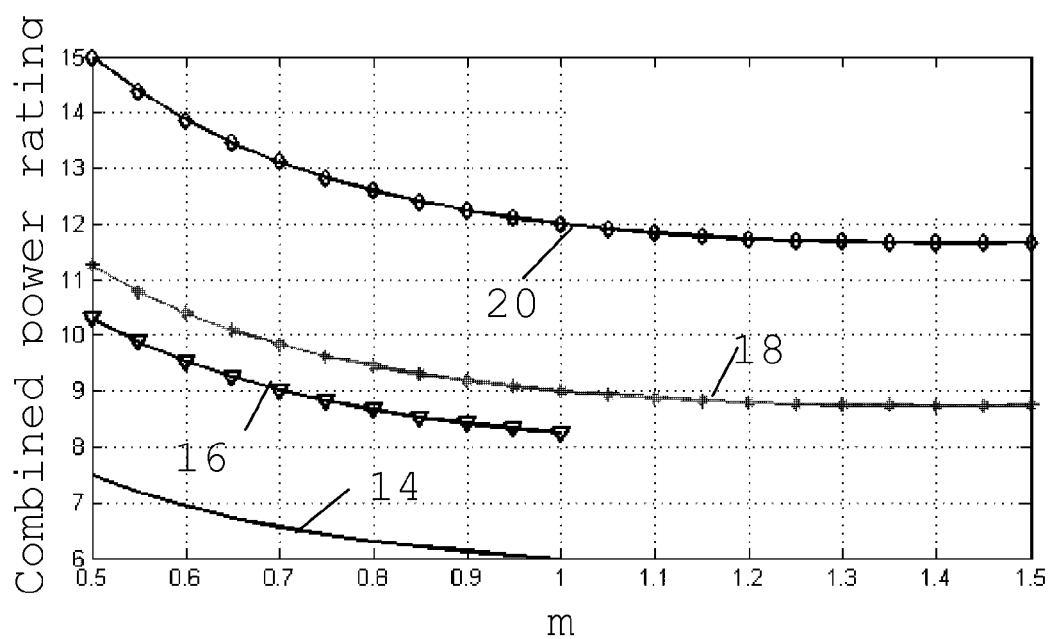
FIG. 9 shows a comparison of the performance of the converter cell in FIG. 2 with three known converter cells, and FIG. 10 schematically shows the insertion of energy storage elements by a phase arm using the cells in FIG. 2.

It may be observed that the dimensioning case is when $\cos(\phi)$ is equal to 1. The combined power rating of the semiconductors can be compared between the different implementations by multiplying $\hat{P}_{arm}$ with the number of equally rated semiconductors, i.e. switching units, per arm. That is, for the half-bridge $\hat{P}_{arm}$ is multiplied by 2, for the full-bridge $\hat{P}_{arm}$ is multiplied by 4, for the double-clamped cell $\hat{P}_{arm}$ is multiplied by 2.75, and for the double voltage contribution cell $\hat{P}_{arm}$ is multiplied by 3. The normalized values of the combined power rating of the semiconductors are shown as functions of the modulation index in FIG. 9. FIG. 9 shows the combined power rating 14 of a half-bridge cell, the combined power rating 16 of a clamped double-cell, the combined power rating 18 of a double voltage cell and the combined power rating 20 of a full-bridge cell.

In order to validate the functionality of the double voltage contribution cell, some simulations may be performed, for instance using PSCAD/EMTDC (Power System Computer Aided Design/Electromagnetic Transients including DC). As one example one phase leg may be simulated with 4 double voltage contribution cells per arm. As every double voltage contribution cell has two capacitors, this means that each arm can generate a 9-level voltage waveform. The modulation index was chosen to be $\sqrt{2}$. The reason for this is that at this modulation index, the differential mode component in the arm energies is canceled out at active power transfer which minimizes the energy variations.

The load was considered to be a passive resistive-capacitive load. The reactive power generated by the load capacitor matched exactly the reactive power consumption of the arm inductors. The load was chosen in this way in order to fully illustrate the cancellation of the differential mode component in the arm energies. The amplitude of the alternating voltage was 10.7 kV, and the amplitude of the alternating current was 2.67 kA. Consequently, 14.3 MVA was transferred to the load. The cell capacitors were 3.3 mF dc-capacitors with a nominal voltage of 2.45 kV. This means that the nominal energy storage to power transfer ratio was 11.2 kJ/MVA.

Figure 10:
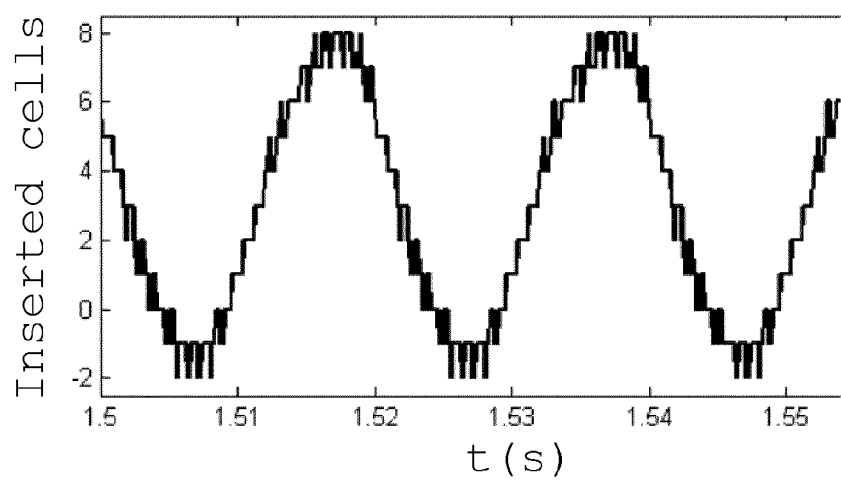

In order to generate an alternating voltage waveform with an amplitude higher than half of the dc-link voltage, negative voltages must be inserted in the arms. FIG. 10 shows the number of inserted capacitors in the upper arm as a function of time t in seconds s. A negative number indicates that capacitors are inserted with a negative polarity. The converter was controlled in such a way that the capacitor voltages were compensated for by means of feed-forward control. The simulation showed that despite the relatively small cell capacitors, the voltage ripple was still well below −10% as the differential mode component was eliminated. Furthermore, since the two capacitors in each double voltage contribution cell are either bypassed, connected in series, or in parallel, the voltage across the two capacitors in each cell is always the same.

The presented bipolar double voltage contribution cell is an extension of an existing cell. By adding two active switching units, parallel connection of the two cell capacitors becomes possible as well as the insertion of negative voltage levels. Although this causes a slight increase in the cost of the cell the capacitor voltage ripple is significantly reduced. This is partially explained by the fact that the capacitor voltage balancing is improved by the parallel connection of the capacitors. The major part of the reduced voltage ripple is, however, explained by the extended operating regime that comes with the possibility of inserting negative voltage levels. That is, the double voltage contribution cell makes it possible to operate the converter with a modulation index that is higher than unity which has a significant impact on the energy variations in the converter arms.

An evenly distributed energy in a multilevel converter is of interest because this allows the size of the capacitors to be lowered. One first type of balancing involves distributing the energy as evenly as possible between the upper and lower phase arms of a phase leg. A second type of balancing involves distributing the energy as evenly as possible between the cells in each phase arm.

Furthermore, the balance between the phase arms is influenced by the modulation index, where a modulation index above 1 provides a significant improvement of the balance. However, a modulation index above 1 is only possible with cells able to provide negative voltages. It can thus be seen that the ability of the double voltage contribution cell to provide negative voltage contributions is a measure that improves the first type of balancing.

It is also possible that the DC voltage may vary in certain applications. Also this may require cells with the ability to provide negative voltage contributions.

The balance between the cells of a phase arm is improved through the ability to connected energy storage elements in parallel. It can thereby be seen that the ability to provide states where the energy storage elements are connected in parallel are measures that improve the second type of balancing.

Embodiments of the invention are thus able to provide a number of advantages, such as:

a cell that enables the provision of a converter with a lower number of components than a converter based on the full-bridge cell, low conduction losses because the number of components in the conduction path is reduced compared with the full-bridge cell, good fault current handling capability and the possibility to provide negative voltage contributions.

From the foregoing discussion it is evident that the present invention can be varied in a multitude of ways.

The switching elements were for instance exemplified as being IGBTs. It should however be realized that other types of transistors may be used, like Field Effect Transistors (FET). Furthermore a switching unit may also be realized in the form of a Reverse Conduction IGBT (RC-IGBT) or a Bi-mode IGBT (BIGT). For this reason it should also be realized that a switching element and anti-parallel unidirectional conducting element may be provided as separate components or circuits as well as separate functions within a component or circuit.

It shall consequently be realized that the present invention is only to be limited by the following claims.

The invention claimed is:

1. A cell for use in a phase arm of a multilevel converter converting between alternating current and direct current, said cell comprising:
   a first section with a first group of series connected switching units, which first group is connected in parallel with a first energy storage element, where a junction between a first and a second switching unit of the first group forms a first cell connection terminal;
   a second section with a second group of series connected switching units, which second group is connected in parallel with a second energy storage element, where a junction between a third and a fourth switching unit of the second group forms a second cell connection terminal; and
   an interconnecting section interconnecting the first and the second sections and comprising a third group of series-connected switching units, which third group comprises a fifth, sixth and seventh switching unit, where the fifth and sixth switching units are connected in parallel with the first energy storage element and the sixth and seventh switching units are connected in parallel with the second energy storage element,
   wherein the switching units are controllable to provide a first voltage contribution state that provides a voltage contribution that is a sum of the voltages of the first and second energy storage element, and a second voltage contribution state that provides a voltage contribution caused by the first energy storage element being connected in parallel with the second energy storage element, and
wherein the first and second voltage contribution states are positive voltage contribution states, and the second state is obtained when the first, fourth, fifth and seventh switching units are on.

2. The cell according to claim 1, wherein each of the first and the second energy storage element has a positive and a negative end.

3. The cell according to claim 2, wherein the switching units are controllable to provide a number of positive and negative voltage contribution states.

4. The cell according to claim 1, wherein the switching units are controllable to provide a number of positive and negative voltage contribution states.

5. The cell according to claim 4, wherein at least one of the positive and negative voltage contribution states is a first type of voltage contribution state where the switching units are controllable to connect at least one of the energy storage elements between the first and second cell connection terminals with a first orientation, and another of the positive and negative voltage contribution states is a second type of voltage contribution state where the switching units are controllable to connect at least one of the energy storage elements between the first and second cell connection terminals with a second, opposite orientation.

6. The cell according to claim 5, wherein the switching units are controllable to provide a third voltage contribution state that provides a zero voltage contribution.

7. The cell according to claim 1, wherein the switching units are controllable to provide a third voltage contribution state that provides a zero voltage contribution.

8. The cell according to claim 7, wherein the first voltage contribution state is obtained when the first, fourth and sixth switching units are on.

9. The cell according to claim 8, wherein the switching units are controllable to provide further voltage contribution states that provide voltage contributions being the voltage of either the first or the second energy storage element.

10. The cell according to claim 7, wherein the third voltage contribution state is obtained when the second, third and sixth switching units are on.

11. The cell according to claim 10, wherein the switching units are controllable to provide a negative voltage contribution state, said negative voltage contribution state is opposite to the second voltage contribution state and is obtained when the second, third, fifth and seventh switching units are on.

12. The cell according to claim 7, wherein the switching units are controllable to provide further voltage contribution states that provide voltage contributions being the voltage of either the first or the second energy storage element.

13. The cell according to claim 10, wherein the switching units are controllable to provide further voltage contribution states that provide voltage contributions being the voltage of either the first or the second energy storage element.

14. The cell according to claim 1, wherein the switching units are controllable to provide a negative voltage contribution state, said negative voltage contribution state is opposite to the second voltage contribution state and is obtained when the second, third, fifth and seventh switching units are on.

15. The cell according to claim 14, wherein the switching units are controllable to provide further voltage contribution states that provide voltage contributions being the voltage of either the first or the second energy storage element.

16. The cell according to claim 1, wherein all switching units of the sections are provided as switching elements with anti-parallel unidirectional conducting elements.

17. The cell according to claim 16, wherein the direction of current conduction of the unidirectional conducting elements in the first section is towards the positive end of the first energy storage element, the direction of current conduction of the unidirectional conducting elements in the second section is towards the positive end of the second energy storage element and the direction of current conduction of the unidirectional conducting elements-in the interconnecting section is towards the positive end of the first energy storage element.

18. The cell according to claim 16, wherein the switching elements-of the sections are configured to be turned off if a fault current due to a DC fault runs through the phase arm.

19. A multilevel converter configured to convert between alternating current and direct current and comprising:
at least one phase arm with a number of cells between a DC pole and an AC terminal, said cells comprising at least one double voltage contribution cell, said double voltage contribution cell comprising:
a first section with a first group of series connected switching units, which first group is connected in parallel with a first energy storage element, where a junction between a first and a second switching unit of the first group forms a first cell connection terminal;
a second section with a second group of series connected switching units, which second group is connected in parallel with a second energy storage element, where a junction between a third and a fourth switching unit of the second group forms a second cell connection terminal; and
an interconnecting section interconnecting the first and the second sections and comprising a third group of series-connected switching units, which third group comprises a fifth, sixth and seventh switching unit, where the fifth and sixth switching units are connected in parallel with the first energy storage element and the sixth and seventh switching units are connected in parallel with the second energy storage element,
wherein the switching units are controllable to provide a first voltage contribution state that provides a voltage contribution that is a sum of the voltages of the first and second energy storage element, and a second voltage contribution state that provides a voltage contribution caused by the first energy storage element being connected in parallel with the second energy storage element, and
wherein the first and second voltage contribution states are positive voltage contribution states, and the second voltage contribution state is obtained when the first, fourth, fifth and seventh switching units are on.

20. The multilevel converter according to claim 19, further comprising a control unit configured to control the switching units of the cell.

* * * * *